Patented Apr. 18, 1939

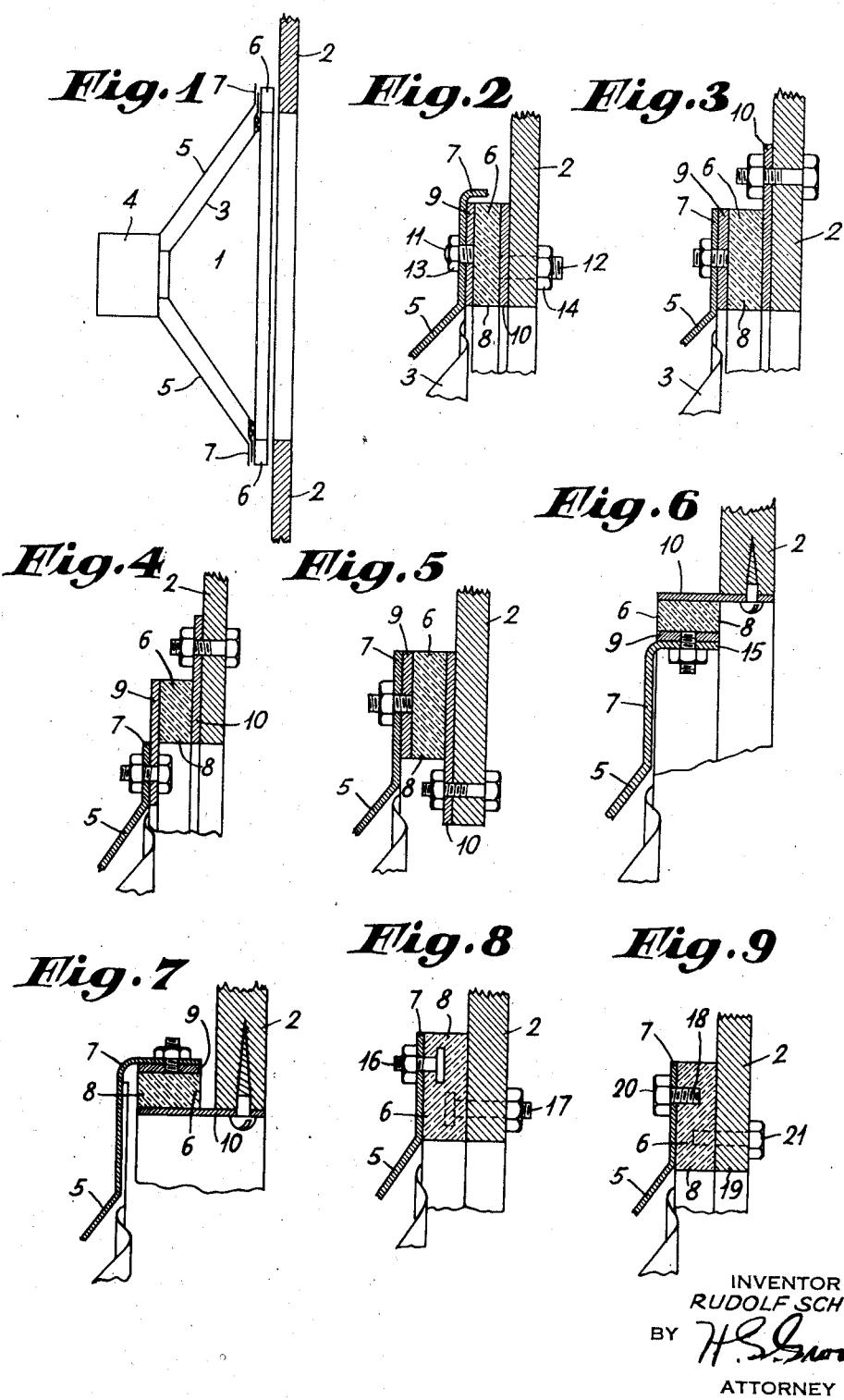

2,154,705

UNITED STATES PATENT OFFICE 2,154,705

LOUDSPEAKER SUPPORT

Rudolf Schultz, Berlin, Germany, assignor to Telefunken Gesellschaft für Drahtlose Telegraphie m. b. H., Berlin, Germany, a corporation of Germany Application October 9, 1937, Serial No. 168,161 In Germany October 16, 1936

6 Claims. (Cl. 179—146)

This invention is concerned with loudspeaker constructions, and more particularly with the mounting or supporting of loudspeaker diaphragms.

There is now known a new work material which is produced by having a body of soft rubber vulcanized between a pair of metal plates. The soft rubber thereby becomes practically fixedly connected with the metal. The figures for the strength of the combination are higher than the strength of the material of the rubber.

When this new work material is employed in apparatus for distance communication the advantage obtained is that the apparatus can be properly connected with the base or supporting wall, while previously the form of the apparatus was subjected to change if care was not taken in the process of mounting the same. In employing the new work material, difficulties otherwise encountered especially in the construction of loudspeakers are overcome.

Ordinarily, the loudspeaker chassis is fastened in such manner to a sounding board or to the front wall of a loudspeaker casing, that between the loudspeaker and the wall a strip consisting of felt, rubber, card board or the like is placed. The chassis proper is then screwed thereon. The screws thereby rest on the chassis of the loudspeaker as well as on the wall in a rigid fashion. Now, in practice it is not possible so to tighten up the screws that the loudspeaker is uniformly pressed against the supporting wall. In fact, the loudspeaker is usually pressed against the individual mounting places in a varying degree, so that when tightening up the screws the loudspeaker chassis or the diaphragm housing being not very rigid in shape can be readily subjected to deformation. But again the shape of the diaphragm of the loudspeaker will thereby be changed thus preventing unobjectionable reproduction. Already small deformations of the diaphragm often cause a shifting of the drive system acting on the diaphragm, thus causing clattering of the system. In dynamic loudspeakers the oscillatory coil may be shifted out of its central position in the narrow air gap.

As already stated above these drawbacks are avoided in that the interposed layer for the loudspeaker chassis to be mounted to a supporting wall consists of an elastic base layer joined with one or several metallic layers. This intermediate layer is preferably formed in that a soft rubber body is vulcanized between metal plates. During the vulcanizing process, between the soft rubber body and the metal a chemical reaction is produced joining the soft rubber with the metal in a practically absolutely rigid manner. In place of soft rubber also other materials similar to soft rubber can be used such as for instance synthetic rubber marketed under the name Buna.

This construction has the advantage that the one metal layer can be fixedly secured to the base, and the other metal layer to the part of the apparatus to be fastened on, for instance the loudspeaker chassis, without involving a direct joining in the manner of screws or other fastening means between the base and the loudspeaker chassis or diaphragm housing, since the elastic intermediate layer is situated between the two metal layers.

Eventually, the arrangement may also be such that only a single metal layer is joined with the elastic intermediate layer, and which is fastened either to the supporting wall or to the loudspeaker chassis. In this case the screws are directly screwed into the elastic intermediate layer, but it will be preferable however, to provide to this end special bushings in the elastic intermediate layer rigidly joined with the elastic base. Obviously, there also exists the possibility simply to insert the bushings over a certain length into the elastic intermediate layer and into which the fastening means are inserted such as for instance screws for the fastening to the supporting wall, and for the loudspeaker chassis.

Obviously, also other parts of the apparatus sensitive to deformations and displacing due to clamping can be joined together with the intermediate layer, such as condensers, coils, or like circuit elements. Aside from such individual circuit elements also larger structural units can be fastened in the apparatus in this way such as the entire receiver part in radio receiver structures. Special advantages are obtained in apparatus with combined loudspeakers. In the apparatus, also variable condensers can be fastened in this manner in accordance with the invention in combined apparatus for avoiding acoustic feed back or similar phenomena.

The figures show examples of fastening loudspeaker chassis to the supporting wall in schematical representation.

In the figures identical parts are designated by the same reference characters.

Figure 1 represents a loudspeaker 1 mounted to a base 2 for instance a sounding board. The loudspeaker has a diaphragm 3 driven by the system 4. The entire system is fastened to the wall 2 with the diaphragm housing 5, or chassis, and across an intermediate layer 6.

In the Figures 2 to 9 various modes of embodiments of the interposed layer are shown, as well as the manner of fastening the chassis 5 to the base 2. The chassis 5 has at the outside preferably a flat surface. Eventually, the outer rim 7 is bent over. The intermediate layer 6 consists of an elastic material 8 for instance rubber having metal layers 9 and 10 on both sides and which are rigidly joined with the elastic work material 8. The intermediate layer 6 has an annular shape and rests on the entire rim of the chassis 5. Screws 11 and 12 are fixedly connected with the metal layers 9 and 10. The screw bolts 11 in the metal part 9 extend towards the one side beyond the metal part 9. The bolts 11 are inserted through holes in the chassis 5, and fastened to the chassis by means of screws 13. Accordingly, the screw bolts 12 at the metal part 10 and protruding towards the other side of the intermediate layer 6, are brought out through holes in the wall 2 and are tightened up at the supporting wall by means of the screws 14. Preferably the bolts 11 and 12 are displaced to each other in their position at the intermediate layer 6.

In the construction according to Figure 2 the metal parts 9 and 10 are flush with the elastic work material 8 at the side thereof. In the construction according to Figure 3 the metal part 10 on the contrary is extended outwards radially beyond the work material 8. In the construction according to Figure 4 the metal parts 9 and 10 are extended radially beyond the material 8, whereby the part 9 situated near the loudspeaker is extended inwards, and the part 10 on the wall is extended outwards. The arrangement may also be such that the metal layer situated at the wall is alone extended inwards beyond the material 8 while the part 9 is flush with the interposed layer as indicated in Figure 5.

The Figures 6 and 7 show further embodiments in which the interposed layer 6 is attached outside at the rim 7 of the loudspeaker chassis 5. The rim 7 has slot 15 passing to the outside at the places at which the bolts are to be inserted, the said bolts being inserted through the said slots.

Instead of providing metal layers on the intermediate layer 6 the arrangement may also be as shown in Figure 8 in which the bolts 16 and 17 are in a dropped position in the intermediate layer, said bolts being likewise rigidly joined with the elastic work material as in the case of the metal layers, so that they can not become loose. In place of bolts in the elastic work material also bushings 18 and 19 may be arranged in relatively displaced positions as seen from Figure 9. The elastic intermediate layer then is fixedly secured by means of the screws 20 and 21.

What I claim is:

1. Means for resiliently supporting a loudspeaker from a co-operating baffle board, comprising a diaphragm housing having an outer circular rim, an annular metal member fastened to said rim by means of fastening devices, a second annular metal member fastened to the baffle adjacent its opening by means of other fastening devices, and a resilient material permanently affixed to each of said annular metal members and serving as the sole medium for resiliently supporting the loudspeaker from the baffle board.

2. Means for resiliently supporting a loudspeaker from a co-operating baffle board, comprising a diaphragm housing having an outer circular rim extending in a direction parallel to the baffle board, an annular metal member having its inner peripheral portion fastened to said rim by means of fastening devices, a second annular metal member having its outer peripheral portion fastened to the baffle adjacent its opening by means of other fastening devices, the remaining portions of said metal members being in overlapping relation, and a resilient material permanently affixed to each of said annular metal members between overlapping portions and serving as the sole medium for resiliently supporting the loudspeaker from the baffle board.

3. Means for resiliently supporting a loudspeaker from a co-operating baffle board, comprising a diaphragm housing having an outer circular rim extending in the direction of vibration of the diaphragm, a circular metal ring member fastened to said rim by means of fastening devices, a second circular metal ring member fastened to the baffle adjacent its opening by means of other fastening devices, said ring members being concentrically arranged and in spaced relation, and a resilient material permanently affixed to opposing surfaces of said ring metal members and serving as the sole medium for resiliently supporting the loudspeaker from the baffle board.

4. In combination, a loudspeaker provided with a diaphragm housing, a baffle board for said loudspeaker to which the diaphragm housing is adapted to be attached, an annular rim member and means for fastening said member to the diaphragm housing, a second annular rim member spaced from the first member and means for fastening said second member to the baffle board, and a resilient material permanently affixed to opposing surfaces of said annular rim members and serving as the sole medium for resiliently supporting the loudspeaker from the baffle board.

5. In combination, a loudspeaker provided with a diaphragm housing the outer rim portion of which extends in a direction at right angles to the diaphragm axis, a baffle board for said loudspeaker to which the diaphragm housing is adapted to be attached, an annular rim member and means for fastening the inner peripheral portion of said member to the diaphragm rim portion, a second annular rim member spaced from the first member and means for fastening the outer peripheral portion of said second member to the baffle board, the major portions of said rim members being disposed in juxtaposition, and a resilient material permanently affixed to opposing surfaces of the juxtaposed portions of said rim members and serving as the sole medium for resiliently supporting the loudspeaker from the baffle board.

6. In combination, a loudspeaker provided with a diaphragm housing the outer rim portion of which extends in the direction of the diaphragm axis, a baffle board for said loudspeaker to which the diaphragm housing is adapted to be attached, a circular ring member and means for fastening said member to the diaphragm rim portion, a second circular ring member concentrically arranged with respect to and spaced from the first member and means for fastening said second member to the baffle board, and a resilient material permanently affixed to opposing surfaces of said circular ring members and serving as the sole medium for resiliently supporting the loudspeaker from the baffle board.

RUDOLF SCHULTZ.